(12) United States Patent
Booms

(10) Patent No.: US 11,879,502 B2
(45) Date of Patent: Jan. 23, 2024

(54) PRELOAD ASSEMBLY FOR ROLLER BEARINGS

(71) Applicant: Dale Robert Booms, Harbor Beach, MI (US)

(72) Inventor: Dale Robert Booms, Harbor Beach, MI (US)

(*) Notice: Subject to any disclaimer, the term of this patent is extended or adjusted under 35 U.S.C. 154(b) by 0 days.

(21) Appl. No.: 17/818,461

(22) Filed: Aug. 9, 2022

(65) Prior Publication Data

US 2022/0381297 A1 Dec. 1, 2022

Related U.S. Application Data

(62) Division of application No. 17/158,054, filed on Jan. 26, 2021, now Pat. No. 11,448,261.

(51) Int. Cl.
*F16C 43/04* (2006.01)
*F16C 19/38* (2006.01)

(52) U.S. Cl.
CPC .............. *F16C 43/04* (2013.01); *F16C 19/38* (2013.01); *F16C 2229/00* (2013.01); *F16C 2326/02* (2013.01)

(58) Field of Classification Search
CPC ...... F16C 2229/00; F16C 43/00; F16C 43/02; F16C 43/04; F16C 43/045; F16C 2226/12; F16C 2226/10
See application file for complete search history.

(56) References Cited

U.S. PATENT DOCUMENTS 9,834,038 B2 * 12/2017 Chung ................ B60B 27/0021

* cited by examiner

*Primary Examiner* — Christopher J Besler

(57) ABSTRACT

A preload assembly for bearings comprising in combinations a threaded bolt, an anti-rotational washer, a serrated edge locking washer, and a threaded locking nut having a shallow outer profile and at least four locking notches in an outer edge thereof.

2 Claims, 6 Drawing Sheets

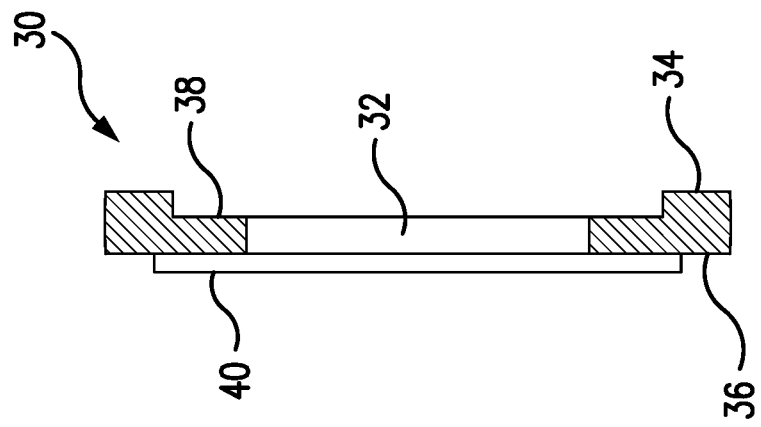
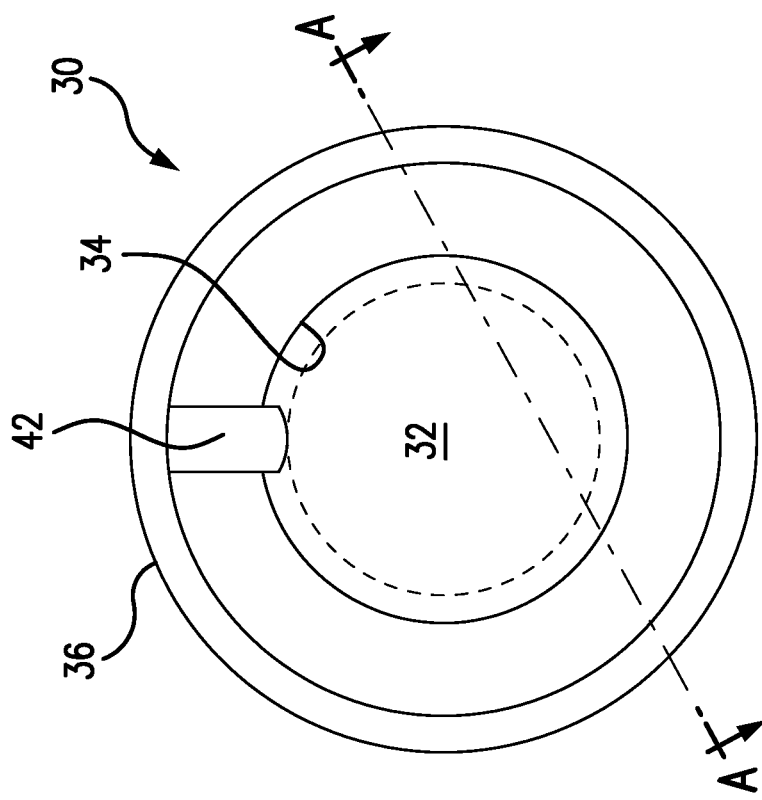
FIG. 7
FIG. 8

PRELOAD ASSEMBLY FOR ROLLER BEARINGS

CROSS-REFERENCE TO RELATED APPLICATIONS

This application is a divisional of U.S. patent application Ser. No. 17/158,054 filed on Jan. 26, 2021 for which priority is claimed.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The applicant is unaware of any prior art in this field.

BRIEF SUMMARY OF THE INVENTION

The present invention is a preload assembly for roller bearings. The preload assembly for bearings comprises a threaded bolt. The threaded bolt has a predetermined length and a threaded shaft that has a predetermined diameter. The threaded bolt has an enlarged head. The enlarged head comprises a compression head and a center mounted hex head wherein the compression head is larger in diameter than the hex head. The compression head has a channel surrounding the hex head forming a wall around the hex head and there is a slot formed in the wall to receive a locking tab. There is an outside surface on the compression head that has a predetermined number of threads thereon. The threaded bolt has a predetermined overall length.

There is a first anti-rotational washer. The first anti-rotational washer has a center opening which is larger than the bolt and enlarged head, but smaller than the axle on which the assembly is to be used. The first anti-rotational washer has two side surfaces. There is an inside surface and an outside surface. The inside surface has a shallow recess larger in diameter than the axle. The outside surface is a raised surface that has a diameter larger than the axle. The center opening has contained therein a first locking tab that aligns with the slot in the wall.

There is a serrated edge locking washer.

There is a locking nut that has a shallow outer profile and at least four locking notches in an outer edge thereof.

The present invention is a preload assembly for bearings wherein the length of the threaded shaft is from 0.750 to 3.00 inches; there are 7 to 27 threads on the threaded shaft; the diameter of the threaded bolt is from 0.625 to 0.875 inches.

In addition, the threaded compression head has from 6 to 18 threads; first anti-rotational washer inside surface shallow recess has a diameter of from 2.0 to 3.0 inches; the anti-rotational washer inside surface shallow recess has a depth of from 0.001 to 0.062 inches; the outside surface raised surface has a diameter of from 2.0 to 3.2 inches; the outside surface raised surface has a height of from 0 to 0.062 inches.

The outside surface of the threaded locking nut is biased downwardly from a center to an outside edge and the entire assembly is covered by a hub.

In one embodiment of the invention, there is a threaded bolt having a predetermined length and a threaded shaft that has a predetermined diameter. The threaded bolt has an enlarged head. The enlarged head comprises a compression head and a center mounted hex head. The compression head is larger in diameter than the hex head. The compression head has a channel surrounding the hex head forming a wall around the hex head.

There is a slot formed in the wall to receive the locking tabs, an outside surface of the compression head has a number of predetermined threads thereon. The threaded bolt has a predetermined overall length of from 1 inches to 3 inches and a diameter of 1 inch to 2 inches.

There is another embodiment of this invention, which is a method of preloading bearings in a wheel assembly the method comprises preparing an axle with roller bearings and races. The axle has a bolt stud with a threaded center bore on an outside end.

The preload assembly is created by inserting the threaded bolt into the bolt stud then sliding an anti-rotational washer over the threaded bolt to interface with the axle, then sliding the serrated edge locking washer against the anti-rotational washer then threading the threaded locking nut onto the compression head and turning and threading against the serrated edge locking washer and all components. The assembly is then tightened by using a torque wrench to tighten the threaded nut to a pre-prescribed torque.

The method described Supra can have an additional step that provides a hub covering over the preload assembly.

The first anti-rotational washer configured for use in a preload assembly for bearings has a center opening which is larger than the bolt and enlarged head, but smaller than the axle on which the assembly is to be used. The anti-rotational washer has two side surfaces, an inside surface and an outside surface. The inside surface has a shallow recess larger in diameter than the axle. The outside surface is a raised surface that has a diameter larger than the axle. The center opening has contained therein first locking tab that aligns with the slot in the wall.

In a second embodiment there is a second anti-rotational washer configured for use in a preload assembly for bearings. The second anti-rotational washer has a center opening which is larger than the bolt and enlarged head, but smaller than the axle on which the assembly is to be used. The second anti-rotational washer has an inside surface. The inside surface has a shallow recess larger in diameter than the axle, but no raised surface on the opposite side. The center opening has contained therein a first locking tab that aligns with the slot in the wall.

BRIEF DESCRIPTION OF THE SEVERAL VIEWS OF THE DRAWING(S)

FIG. 7 is a full top view of the first anti-rotational washer with a raised surface.

FIG. 8 is a cross sectional view of FIG. 7 through line A-A.

DETAILED DESCRIPTION OF THE INVENTION AND DRAWINGS

Figure 1:
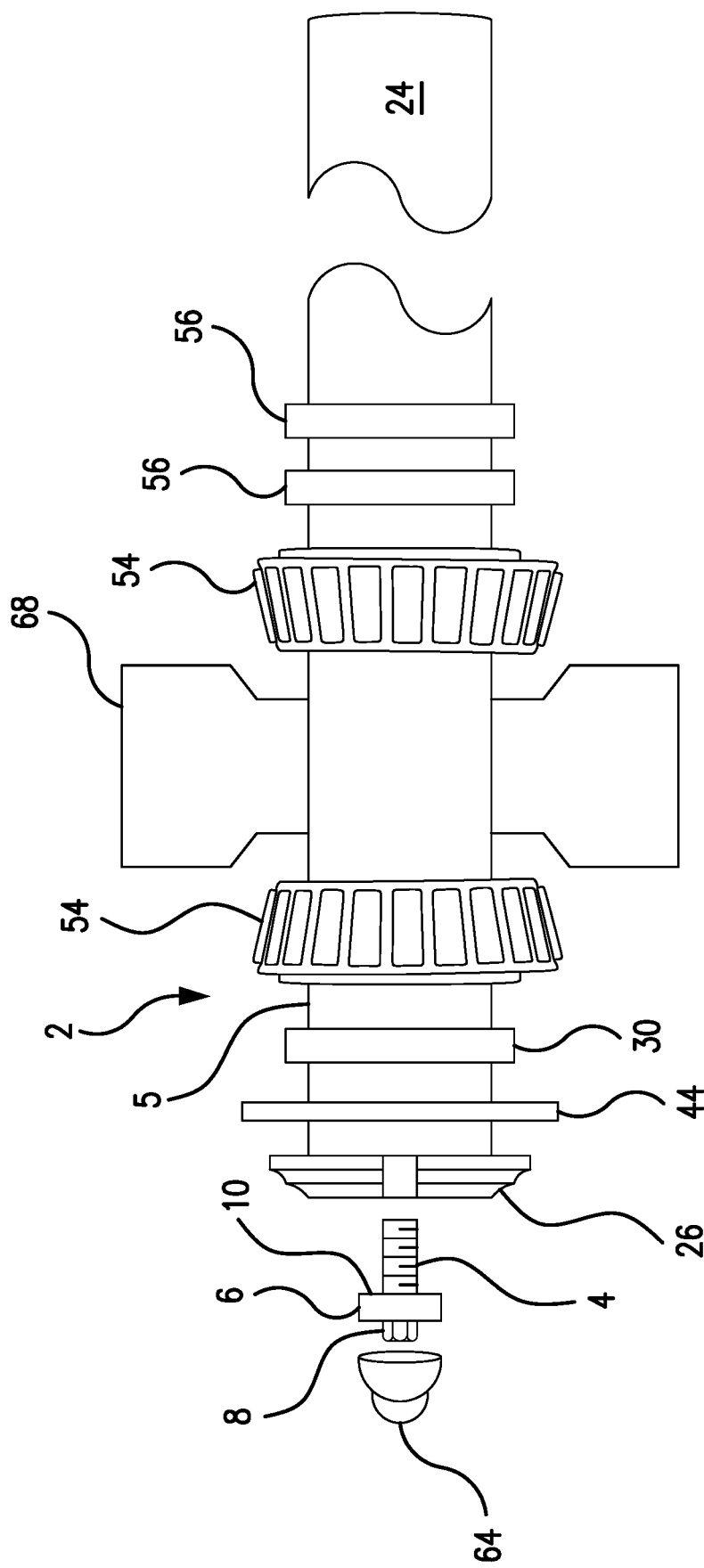
FIG. 1 is a full side view of the preload assembly for roller bearings showing a partial axle which is not part of the invention.

FIG. 1 shows the preload assembly 2 for roller bearings. The preload assembly for bearings 2 comprises a threaded bolt 4. The threaded bolt 4 has a predetermined length and a threaded shaft that has a predetermined diameter. The threaded bolt 4 having an enlarged head 6. The enlarged head 6 comprises a compression head 10 and a center mounted hex head 8. The compression head 10 is larger in diameter than the hex head 8. The compression head 10 has a channel 12 surrounding the hex head 8 forming a wall 14 around the hex head 8 and there is a slot 16 (shown in FIG. 2) formed in the wall 14 to receive the locking tabs 70 (shown in FIG. 9). There is an outside surface 20 of the compression head 10 that has a predetermined number of threads 22 thereon. The threaded bolt 4 has a predetermined overall length.

There is a first anti-rotational washer 30. The anti-rotational washer 30 has a center opening 32 that is larger than the bolt and enlarged head, but smaller than an axle 24 (FIG. 1) on which the preload assembly 2 is to be used. The anti-rotational washer 30 has two side surfaces. There is an inside surface 34 and an outside surface 36 (shown in FIGS. 7 and 8). The inside surface 34 has a shallow recess 38 larger in diameter than the axle 24. The outside surface 36 is a raised surface 40 that has a diameter larger than the axle 24. The center opening 32 has contained therein first locking tab 42 that aligns with the slot 16 in the wall 14.

There is a locking nut 26. The locking nut 26 has a shallow outer profile 48 and at least four locking notches 50 in an outer edge 52 thereof.

In FIG. 1 there is shown the roller bearings 54 and wheel hub 68 not part of the invention. Seals 56 are first mounted on the axle 24. The first roller 54 is slid onto the axle 24 to a predetermined point on the axle 24. Then a second roller bearing 54 is slid onto the axle 24. The hub 68 is then mounted on the axle. The threaded bolt 4 is then threaded into the bolt stud and tightened. The anti-rotational washer 30 is slid into position next. The serrated edge locking washer 44 is added next. Then the locking nut 26. Then the threaded bolt 4 is threaded into the end of the axle 24. It has been discovered that the length and diameter of the thread of the threaded bolt 4 and the lock nut 26 gives the exact amount of torque placed upon the bearing assembly 2 to create the correct load for the preloaded bearing assembly 2.

The present invention is a preload assembly for bearings 2 wherein the length of the threaded shaft 60 is from 0.750 to 3.00 inches.

Figure 3:
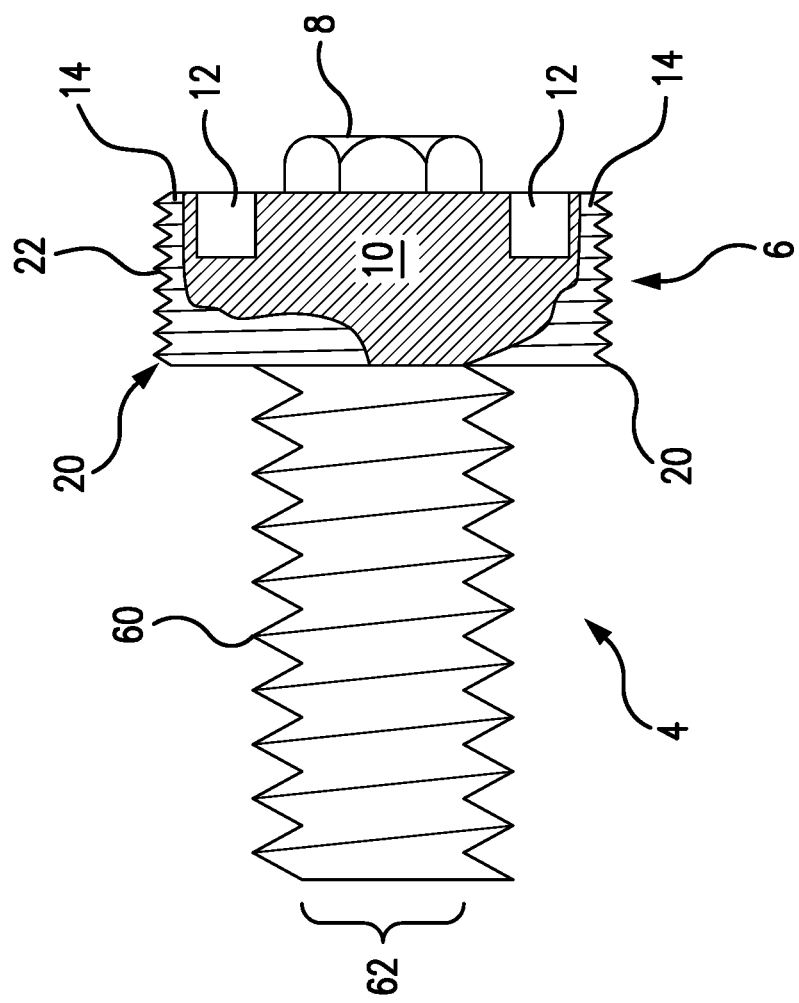
FIG. 3 is a full side view of the threaded bolt.
Figure 2:
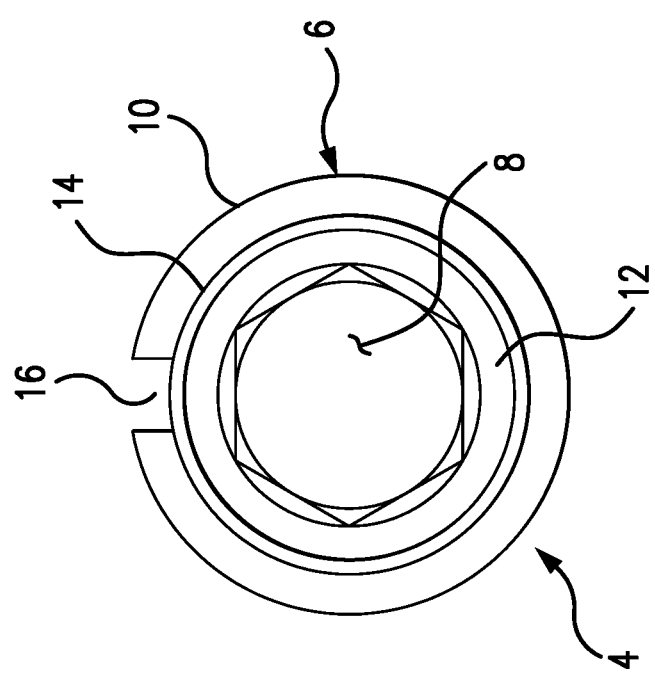
FIG. 2 is a full top view of the threaded bolt.

FIG. 2 shows the threaded bolt 4 from the top. The preload assembly for bearings 2 comprises a threaded bolt 4. The threaded bolt 4 has a predetermined length and a threaded shaft 60 that has a predetermined diameter 62 (FIG. 3). The threaded bolt 4 has an enlarged head 6. The enlarged head 6 comprises a compression head 10 and a center mounted hex head 8. The compression head 10 is larger in diameter than the hex head 8. The compression head 10 has a channel 12 surrounding the hex head 8 forming a wall 14 around the hex head 8 and there is a slot 16 formed in the wall 14 to receive the first locking tab 42 (FIG. 7). There is an outside surface 20 of the compression head 10 that has a predetermined number of threads 22 thereon. The threaded bolt 4 has a predetermined overall length.

FIG. 3 shows the threaded bolt 4 from the side. The preload assembly for bearings 2 comprises a threaded bolt 4. The threaded bolt 4 has a predetermined length and a threaded shaft 60 that has a predetermined diameter 62. The threaded bolt 4 has an enlarged head 6. The enlarged head 6 comprises a compression head 10 and a center mounted hex head 8. The compression head 10 is larger in diameter than the hex head 8. The compression head 10 has a channel 12 surrounding the hex head 8 forming a wall 14 around the hex head 8 and there is a slot 16 formed in the wall 14 to receive a first locking tab 42 (FIG. 7). There is an outside surface 20 of the compression head 10 that has a predetermined number of threads 22 thereon. The threaded bolt 4 has a predetermined overall length.

Figure 4:
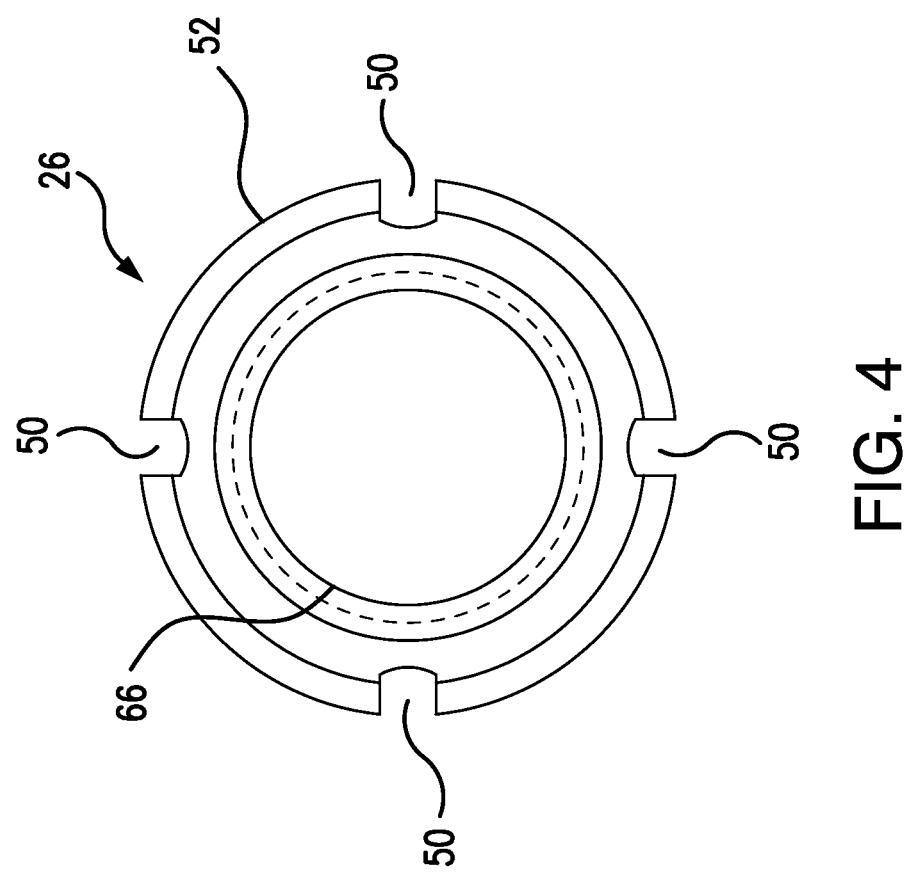
FIG. 4 is a full top view of the threaded locking nut.

FIG. 4 shows the threaded locking nut 26 from the top. The locking nut 26 has a shallow outer profile 48 and at least four locking notches 50 in an outer edge thereof 52. There is an inside surface 66 that is threaded which thread onto the outside surface 20 of the compression head 10.

Figure 5:
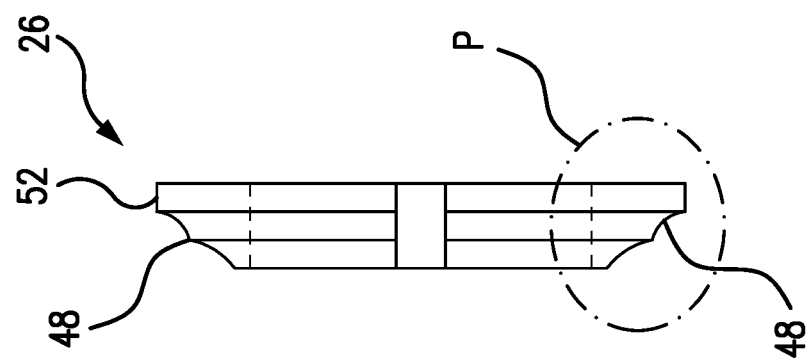
FIG. 5 is a full side view of the threaded locking nut.

FIG. 5 shows the threaded locking nut 26 shown from the side. The locking nut 26 has a shallow outer profile 48 a thickness of from 3/16 inch to 1 inch (FIGS. 5 and 6) and at least four locking notches 50 in an outer edge thereof (FIG. 4). There is an inside surface 66 that is threaded and threads to the outside surface 20 of the compression head 10 from the side. FIG. 4 shows the threaded locking nut 26 from the top. The locking nut 26 has a shallow outer profile 48 and at least four locking notches 50 in an outer edge thereof.

Figure 6:
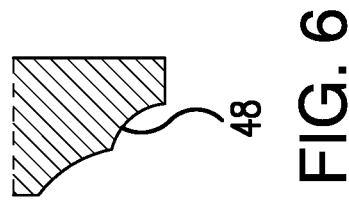
FIG. 6 is a partial view of the threaded locking nut taken at point P of FIG. 5.

FIG. 6 shows a sectional view of the threaded locking nut 26 taken at point p on FIG. 5.

FIG. 7 shows the anti-rotational washer 30 from the top. The anti-rotational washer 30 has a center opening 32 which is larger than the bolt and enlarged head, but smaller than the axle 24 on which the preload assembly for roller bearings 2 is to be used. The anti-rotational washer 30 has two side surfaces. There is an inside surface 34 and an outside surface 36. The inside surface 34 has a shallow recess 38 larger in diameter than the axle 24. The outside surface 36 is a raised surface 40 that has a diameter larger than the axle 24. The center opening 32 has contained therein a first locking tab 42 that aligns with the slot 16 in the wall 14. The raised surface 40 rests against the serrated edge locking washer 44 which creates a gap at the outer edge allowing access to the serrations of the serrated lock washer 44 to allow for manipulation of each serration to fold into the locking notches 50. The inside surface shallow recess 38 allows the bearing 54 to come into contact with the anti-rotational washer 30 and be tightened without deforming the bearing 54.

FIG. 8 shows the anti-rotational washer 30 from the side. The anti-rotational washer 30 has a center opening 32 which is larger than the bolt 4 and enlarged head 10, but smaller than the axle 24 on which the preload assembly for roller bearings 2 is to be used. The anti-rotational washer 30 has two side surfaces. There is an inside surface 34 and an outside surface 36. The inside surface 34 has a shallow recess 38 larger in diameter than the axle 24. The outside surface 36 is a raised surface 40 that has a diameter larger than the axle 24. The center opening 32 has contained therein a first locking tab 42 that aligns with the slot 16 in the wall 14.

Figure 9:
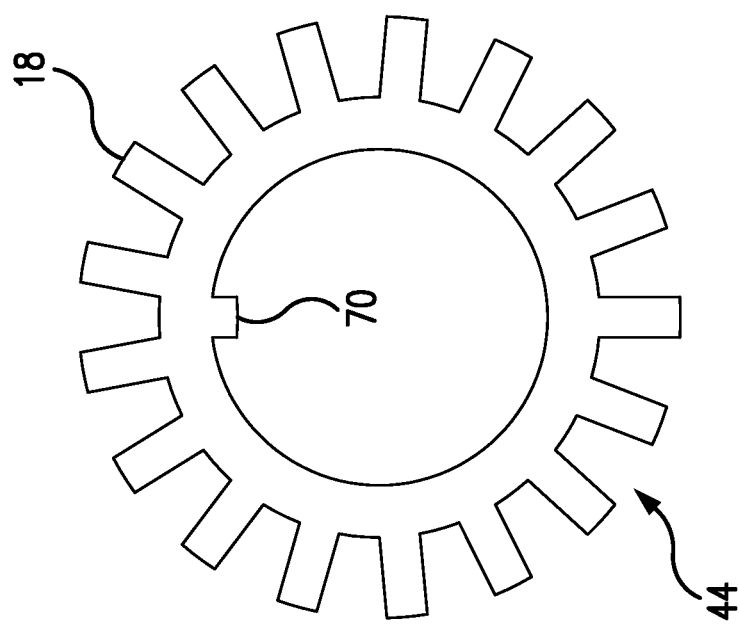
FIG. 9 is a full front view of the serrated edge locking washer.

FIG. 9 shows the serrated edge locking washer 44 from the top. The serrated edge locking washer 44 has second locking tab 70.

Figure 10:
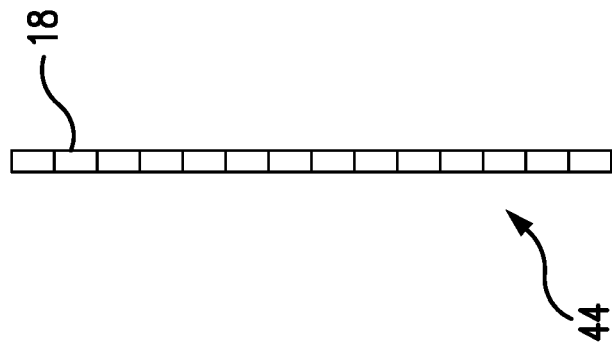
FIG. 10 is a full side view of the serrated edge locking washer.

FIG. 10 shows the serrated edge locking washer 44 from the side.

Figure 11:
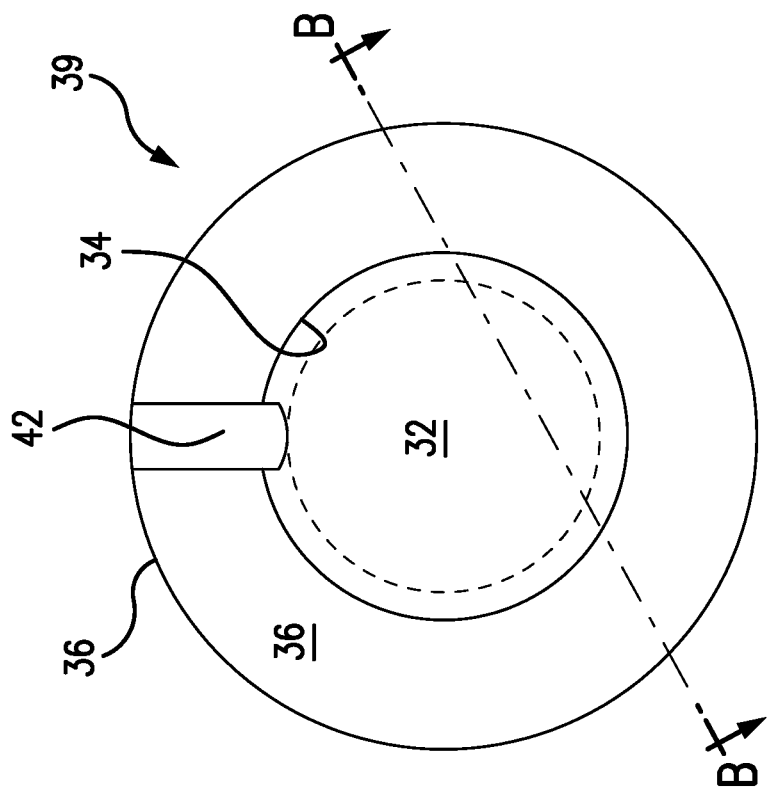
FIG. 11 is a full top view of the second embodiment of the anti-rotational washer.

FIG. 11 shows the second embodiment of an anti-rotational washer 30 from the top. The anti-rotational washer 30 has a center opening 32 which is larger than the bolt and enlarged head, but smaller than the axle 24 on which the preload assembly for roller bearings 2 is to be used. The anti-rotational washer 30 has two side surfaces. There is an inside surface 34 and an outside surface 36. The inside surface 34 has a shallow recess 38 larger in diameter than the axle 24. The outside surface 36 that has a diameter larger than the axle 24. The center opening 32 has contained therein first locking tab 42 that aligns with the slot 16 in the wall 14. The outside surface is not raised. This embodiment is for use on a non-drive axle.

Figure 12:
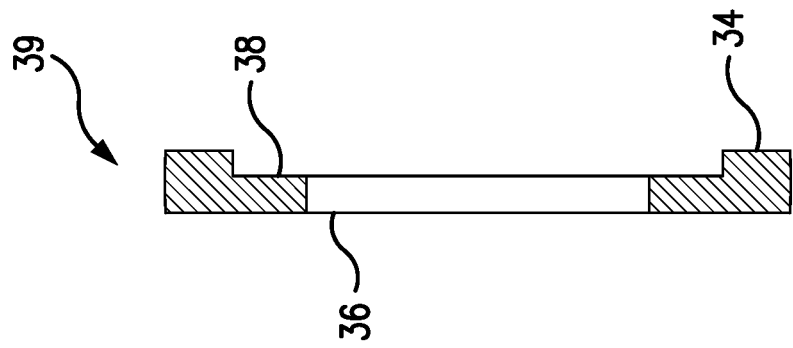
FIG. 12 is a cross sectional view of FIG. 11 through line B-B showing no raised surface on the front surface.

FIG. 12 shows the second embodiment 39 of the anti-rotational washer from the side. The anti-rotational washer 39 has a center opening 32 which is larger than the bolt 4 and enlarged head 10, but smaller than the axle 24 on which the preload assembly for roller bearings 2 is to be used. The anti-rotational washer 39 has two side surfaces. There is an inside surface 34 and an outside surface 36. The inside surface 34 has a shallow recess 38 larger in diameter than the axle 24. The outside surface 36 that has a diameter larger than the axle 24. The center opening 32 has contained therein first locking tab 42 that aligns with the slot 16 in the wall 14. The outside surface 36 is not raised. This embodiment is used on a non-drive axle.

The anti-rotational washer 30 or 39 is slid into place at the back of the serrated edge locking washer 44 with the indented side towards the axle. The anti-rotational washer 30 also has a first locking tab 42. This first locking tab 42 also fits into the slot 16. The serrated edge locking washer 44 has a second locking tab 70 that allows the serrated edge locking washer 44 to fit tightly against the locking nut 26 and fit into the slot 16 locking it into the locking nut 26. The outside surface 36 is a raised surface 40 that has a diameter larger than the axle 24 and fits against the serrated edge locking washer 44.

The preload assembly for bearings 2 comprises a threaded bolt 4. The threaded bolt 4 has a predetermined length and a threaded shaft that has a predetermined diameter. It has been discovered that when the threaded bolt 4 is rotated for insertion into the bolt stud the predetermined thread length regulates the position of the bearings relative to the axle. The outer end of the assembly 2 is covered with a small hub 64 (see FIGS. 5 and 6) which fits over the low profile locking nut and the bolt end.

The first embodiment of the anti-rotational washer is designed for drive axles, the second embodiment of the anti-rotational washer is designed for non-drive axles.

There is a method of preloading bearings in a wheel assembly the method comprising preparing an axle with roller bearings and races wherein the axle has a threaded bolt stud in an outside end. Provide a hub 68 on the axle 24. Assemble the preload assembly by inserting the threaded bolt into the threaded bolt stud and tightening.

Proceed by sliding the anti-rotational washer over the threaded bolt to interface with the axle. Continue by sliding the serrated edge locking washer against the anti-rotational washer. Then thread the threaded locking nut onto the compression head and turning the locking nut against the serrated edge locking washer and all other components. Finish by using a torque wrench to tighten the threaded locking nut to a pre-prescribed torque.

What is claimed is:

1. A method of preloading bearings in a wheel assembly said method comprising:
   i. preparing an axle with roller bearings and races, said axle having a threaded bolt stud in an outside end;
   ii. assemble said preload assembly by:
      b. inserting a threaded bolt into said threaded bolt stud;
      c. sliding an anti-rotational washer over said threaded bolt to interface with said axle on a recess side of said anti-rotational washer;
      d. sliding a serrated edge locking washer against said anti-rotational washer;
      e. threading a compression head of said threaded bolt against a threaded locking nut and further thread the threaded locking nut against said serrated edge locking washer, said anti-rotational washer, and said roller bearings; wherein said threaded bolt has a predetermined length, a threaded shaft having a predetermined diameter, and an enlarged head which comprises said compression head and a center mounted hex head, said compression head being larger in diameter than said hex head, said compression head further having a channel surrounding said hex head forming a wall around said hex head, there being a slot formed in said wall to receive a locking tab, and an outside surface of said compression head having a plurality of helical threads thereon; wherein said anti-rotation washer has a center opening which is larger than said threaded bolt and enlarged head, but smaller than the axle, said anti-rotational washer further having two side surfaces, an inside surface and an outside surface, said inside surface being the recess side and having a shallow recess larger in diameter than said axle said outside surface being a raised surface having a diameter larger than said axle, said center opening having contained therein a first locking tab that aligns with said slot in said wall; wherein said serrated edge locking washer has a second locking tab; and wherein said threaded locking nut has a center opening and, a shallow outer profile, and at least four locking notches in an outer edge thereof;
      f. use a torque wrench to tighten said threaded locking nut to a pre-prescribed torque.

2. The method as claimed in claim 1 wherein there is a step f. that provides a hub covering over said preload assembly.

* * * * *